(12) United States Patent
Ebert et al.

(10) Patent No.: US 8,870,058 B2
(45) Date of Patent: Oct. 28, 2014

(54) CLIP SUPPLY

(75) Inventors: Detlef Ebert, Bad Nauheim (DE); Olaf Bienert, Waldems (DE)

(73) Assignee: Poly-clip System GmbH & Co. KG, Hattersheim (DE)

(*) Notice: Subject to any disclaimer, the term of this patent is extended or adjusted under 35 U.S.C. 154(b) by 232 days.

(21) Appl. No.: 13/324,637

(22) Filed: Dec. 13, 2011

(65) Prior Publication Data

US 2012/0145780 A1 Jun. 14, 2012

(30) Foreign Application Priority Data

Dec. 14, 2010 (EP) .................................... 10194964

(51) Int. Cl.
*G06F 17/00* (2006.01)
*G06K 19/06* (2006.01)
*A22C 11/12* (2006.01)
*A22C 15/00* (2006.01)

(52) U.S. Cl.
CPC ............ *A22C 15/002* (2013.01); *A22C 11/127* (2013.01)
USPC .............. 235/375; 235/492; 452/185; 452/30

(58) Field of Classification Search
USPC ........ 235/375, 385, 475, 477; 283/74, 81, 85; 452/46–48, 181, 183–193, 177, 51–53; 242/159, 160.4; 198/485.1, 486.1, 198/487.1, 678.1, 687.1; 209/576–582; 206/348
See application file for complete search history.

(56) References Cited

U.S. PATENT DOCUMENTS

| | | | | | |
|---|---|---|---|---|---|
| 3,951,262 A | * | 4/1976 | Niedecker | ...................... | 206/343 |
| 4,573,241 A | * | 3/1986 | Niedecker | ...................... | 206/345 |
| 4,720,010 A | * | 1/1988 | Bertram | ........................ | 206/345 |
| 5,259,648 A | * | 11/1993 | Gerber | ............................ | 283/81 |
| 5,772,499 A | | 6/1998 | Niedecker | | |
| 5,782,496 A | * | 7/1998 | Casper et al. | ................... | 283/81 |

(Continued)

FOREIGN PATENT DOCUMENTS

| DE | 19515605 A1 | 10/1996 |
|---|---|---|
| DE | 102009011723 A1 | 9/2010 |

(Continued)

OTHER PUBLICATIONS

JP7171079A—English abstract obtained from Espacenet (http://worldwide.espacenet.com) on Feb. 5, 2013, 2 pages.

(Continued)

*Primary Examiner* — Michael G Lee
*Assistant Examiner* — Suezu Ellis
(74) *Attorney, Agent, or Firm* — Hahn Loeser & Parks LLP

(57) ABSTRACT

A supply of suspension elements, like suspension loops, are configured for being fed in a feeding direction to a clipping machine for producing sausage-shaped products, like sausages, and configured for being attached to said sausage-shaped products. The supply comprises a carrier strip having at least an upper and a lower surface as well as and two longitudinally extending edges arranged parallel to each other. The supply further comprises and a number of suspension elements attached to the upper or lower surface of the carrier strip in at least substantially regular intervals, wherein the carrier strip including the suspension elements is wound up, thereby forming a roll. At least one mark which is attached to the carrier strip at a predefined distance from its end.

17 Claims, 2 Drawing Sheets

(56) References Cited

U.S. PATENT DOCUMENTS

| | | | |
|---|---|---|---|
| 5,885,759 A * | 3/1999 | Nakamura | 430/496 |
| 6,390,912 B1 * | 5/2002 | Niedecker | 452/185 |
| 7,206,010 B2 * | 4/2007 | Maghakian | 347/214 |
| 7,284,704 B2 * | 10/2007 | Lubow | 235/462.01 |
| 7,325,380 B2 | 2/2008 | Ebert | |
| 8,540,555 B2 * | 9/2013 | Reitz et al. | 452/46 |
| 2005/0245187 A1 | 11/2005 | Steinke et al. | |
| 2007/0011990 A1 | 1/2007 | Ebert | |
| 2008/0121677 A1 | 5/2008 | Ebert | |
| 2010/0240288 A1 | 9/2010 | Reitz et al. | |

FOREIGN PATENT DOCUMENTS

| | | | |
|---|---|---|---|
| EP | 1746030 B1 | | 4/2008 |
| FR | 2579871 A | * | 10/1986 |
| JP | 7171079 A | | 7/1995 |
| RU | 2006125637 A | | 1/2008 |
| RU | 2429999 C2 | | 9/2011 |

OTHER PUBLICATIONS

DE19515605A1—English abstract and machine translation obtained from Espacenet (http://worldwide.espacenet.com) on Feb. 5, 2013, 5 pages.

DE102009011723A1—English abstract and machine translation obtained from Espacenet (http://worldwide.espacenet.com) on Feb. 5, 2013, 11 pages.

* cited by examiner

CLIP SUPPLY

This application claims priority to, and the benefit of, European Patent Application No. 10 194 964.2-1260 filed Dec. 14, 2010 with the European Patent Office, which is hereby incorporated by reference.

BACKGROUND OF THE INVENTION

The present invention relates to a supply of suspension elements, like suspension loops, according to claim 1, the usage of said supply according to claim 8, and a method for detecting the end of a supply of suspension elements, like suspension loops, according to claim 9.

In particular, the present invention relates to a supply of suspension elements, like suspension loops, which fed in a feeding direction to a clipping machine for producing sausage-shaped products, like sausages, and which are to be attached to said sausage-shaped products. The supply comprises a carrier strip having at least an upper and a lower surface as well as two longitudinally extending edges arranged parallel to each other, and a number of suspension elements attached to the upper or lower surface of the carrier strip in at least substantially regular intervals. The carrier strip including the suspension elements is wound up, thereby forming a roll.

Furthermore, the present invention further relates to the usage of a supply of suspension elements, like suspension loops, in a clipping machine for producing sausage-shaped products, like sausage.

Moreover, the present invention relates to a method for detecting the end of a supply of suspension elements, like suspension loops, which are fed in a feeding direction to a clipping machine for producing sausage-shaped products, like sausages, and which are attached to said sausage-shaped products. The method comprises the step of feeding suspension loops, which are attached to the upper or lower surface of a carrier strip in at least substantially regular intervals, to the clipping machine for attaching said suspension elements to the sausage-shaped products.

In the production of sausage-shaped products in a clipping machine, a filling material, like sausage meat, is fed into a tubular casing material which is closed at one end by a first closing clip. After a predetermined portion of filling material is fed into said tubular casing material, it is gathered and closed at its second end by applying a second closure clip thereto. Conventionally, for further treatment, said sausage-shaped products are hung up on, e.g., rod-like elements. For this purpose, a suspension element, like a loop, is attached to one end of said sausage-shaped product together with one of the two closing clips which engage said loop.

Suspension elements in the form of loops are known from DE patent 195 15 605. Said suspension elements have an elongated shape and are attached in regular intervals to a longitudinally extending carrier belt transversely to said longitudinally extension. Belt consists of two paper or plastic strips between which the suspension elements are arranged.

From DE laid open document 10 2009 011 723, a clipping a feeding device for feeding suspension elements to a clipping machine is known. Said suspension elements are attached to a carrier strip. The carrier strip is guided into the closing area of the clipping machine in a manner that a suspension element is held in a feeding position in which said suspension element is attached to the sausage-shaped product produced in said clipping machine together with the second clip for closing the sausage-shaped product.

A supply of suspension elements which are attached to a carrier strip is normally formed by winding said carrier strip with said suspension elements, thereby forming a roll. Said roll or supply of suspension elements includes a predetermined number of suspension elements. When placing a new supply of suspension elements to a respective holder on a clipping machine, a number of sausage-shaped products according to the number of suspension elements in said supply may be produced.

In case that a used supply of suspension elements is maintained on said clipping machine or a used supply is placed on the clipping machine, the number of suspension elements of said used supply is not always known. In the case that the number of suspension elements in the supply is less than expected, it is possible that sausage-shaped products without a suspension element are produced. Said sausage-shaped products are not usable anymore. On the other hand, in case that a marginal number of suspension elements are left in said supply, in order to avoid defective goods, the user may replace said "nearly empty" supply by a new one. Also said removed marginal number of suspension elements is not usable anymore.

BRIEF SUMMARY OF THE INVENTION

Thus, it is an object of the present invention to provide a supply of suspension elements, the usage of said supply in a clipping machine and a method for detecting the end of a supply of suspension elements, with which the above mentioned drawbacks can be overcome and with which the production of sausage-shaped products can be ensured.

The aforesaid object with respect to the supply of suspension elements is achieved by the features of claim 1 and the usage of said supply by the features of claim 8, whereas the aforesaid object with respect to the method is achieved by the features of claim 9. Advantageous configurations of the invention regarding the supply of suspension elements are described in claims 2 to 7, and with regard the method in claims 10 to 13.

According to the present invention, there is provided a supply of suspension elements, like suspension loops, being fed in a feeding direction to a clipping machine for producing sausage-shaped products, like sausages, and being attached to said sausage-shaped products. The supply comprises a carrier strip having at least an upper and a lower surface as well as two longitudinally extending edges arranged parallel to each other, and a number of suspension elements, attached to the upper or lower surface of the carrier strip in at least substantially regular intervals. The carrier strip including the suspension elements is wound up, thereby forming a roll. Moreover, in the inventive supply of suspension elements, at least one mark is provided, which is attached to the carrier strip at a predefined distance from its end. By detecting said mark, the number of suspension loops remaining on the carrier strip may be estimated.

In a simple case, said mark may be formed by a visual detectable sign, like a single sheet of plastic or metal. Moreover, said visual detectable mark or sign, respectively, can also be formed by a shape, like a cut-out, a slight bump etc. The visual detection can be carried out by a camera, like a CCD sensor. On the other hand, said mark may be a self-adhesive sheet of metal, e.g. of aluminum or any other suitable metal, which also may be detected by a proximity sensor. In a preferred embodiment, the mark is a data store which includes information regarding the number of suspension elements remaining on the carrier strip in the feeding direction upstream said mark. The mark may be a machine readable label, like a RFID label. In this case, the mark may contain additionally information as to the kind of suspension elements, its material or other kind of production data.

The information included in the mark is used for controlling the clipping machine. If the number of remaining suspension elements is known, the clipping machine may be stopped after an amount of sausage-shaped products have been produced wherein said amount corresponds to the number of remaining suspension elements. On the other hand, if information regarding the kind of suspension elements or the like is available in said mark, this information may be compared to the kind of sausage-shaped products to be produced and/or the kind of casing material, and compatibility may be checked and a respective signal may be generated.

To avoid damaging the mark, it is advantageous to cover the mark by a respective covering element. In case that the mark is a machine readable label, the covering element should be selected to not interfere reading the information in the mark.

In a further advantageous configuration of the supply of suspension elements, the carrier strip is a double layer strip having an upper and a lower layer, with the upper and lower layer each having an upper and a lower surface and with the lower layer facing the lower surface of the upper layer with its upper surface, with the suspension elements disposed between the upper and lower layer in at least substantially regular intervals, wherein the mark is also disposed between the upper and lower layer at a predefined distance from its end. In this case, the mark is protected against damages by the two layers, but can additionally be protected by a cover.

The supply of suspension elements according to the present invention may be used in a clipping machine for producing sausage shaped products. The clipping machine comprises a sensor device for detecting the mark which is attached to the carrier strip of the supply, and for preferably reading out information stored on the mark. Preferably, the sensor device is coupled to the control unit of the clipping machine to allow controlling the clipping machine by using the signal from said sensor device.

According to the present invention, there is further provided a method for detecting the end of a supply of suspension elements, like suspension loops, being fed in a feeding direction to a clipping machine for producing sausage-shaped products, like sausages, and being attached to said sausage-shaped products. The method comprises the steps of feeding suspension loops, which are attached to the upper or lower surface of a carrier strip in at least substantially regular intervals, to the clipping machine for attaching said suspension elements to the sausage-shaped products, and scanning the carrier strip and detecting at least one mark positioned on the carrier strip at a predefined distance from its end. Based on the scanning of the mark, the number of suspension elements remaining on the supply may be estimated and a respective control signal may be generated.

In case that the mark is a machine readable label, like a RFID label, the method includes advantageously the step of reading out the information stored on the mark.

In a further advantageous configuration, the information stored on the mark is an information regarding the number of suspension elements remaining on the carrier strip in the feeding direction upstream said mark.

According to the inventive method, there is further provided a signal to the clipping machine for controlling the clipping machine on the basis of the information readout of the mark. Said signal may be used for controlling the clipping machine.

Additionally or alternatively, a signal corresponding to the information readout of the mark may be outputted. Said signal may be an optical or acoustical signal for informing the user of the clipping machine.

Further advantages and preferred embodiments will be described in the following together with the drawings listed below. The expressions "left", "right", "below" and "above" used in the following description, are referred to the drawings in an alignment such that the reference numbers and the notation of the Figs. used can be read in normal.

DETAILED DESCRIPTION OF THE INVENTION

Figure 1:
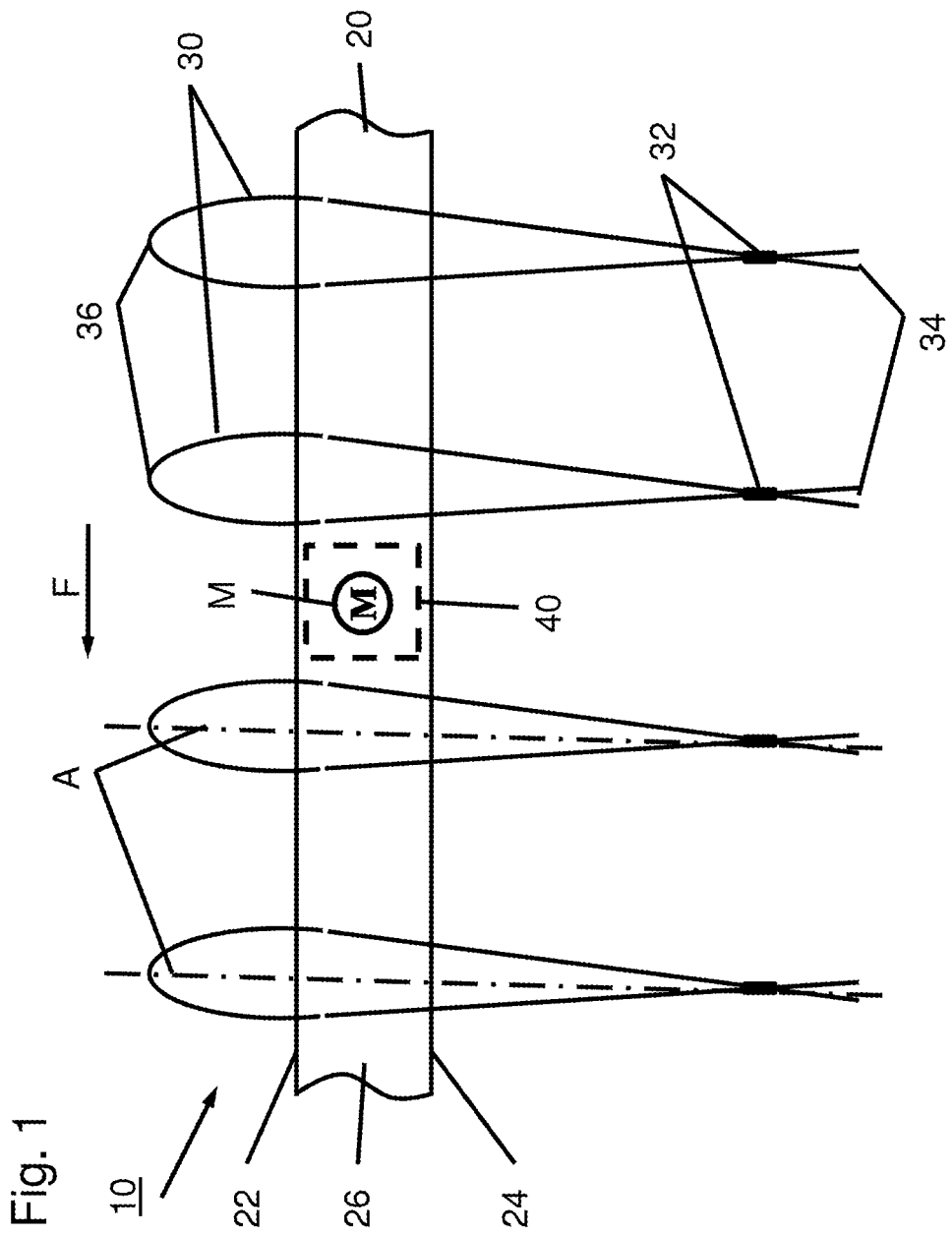
FIG. 1: is a schematic view of a section of a supply of suspension elements according to the present invention.

In FIG. 1, a section of a supply 10 of suspension elements according to the invention is shown. The supply 10 includes a carrier strip 20 on which suspension elements 30 in the form of flexible loops are attached, e.g. by an adhesive applied to carrier strip 20. Loops 30 will be fed to a clipping machine in a feeding direction F. In the clipping machine the front most loop 30 is brought into a position, in which said loop 30 is caught and fixedly attached to the sausage-shaped product, like a sausage, produced in said clipping machine.

As it can be seen in FIG. 1, carrier strip 20 has two longitudinal, parallel side edges 22, 24, an upper surface 26 and a lower surface. Loops 30 are formed by a filament of textile or plastic material, which is bent and knotted at its free ends by a knot 32 or the like. Thereby, the knotted portion forms a first end 34 and the bent portion forms a second end 36. Loops 30 are of an elongated oval shape and extending along an axis A which crosses the first and second ends 34, 36. In the embodiment according to FIG. 1, loops 30 are attached to the upper surface 26 of carrier strip 20 and in a plane parallel to carrier strip 20. Axis A of loops 30 is at least substantially perpendicularly aligned to side edges 22, 24 of carrier strip 20. Loops 30 are positioned in at least substantially regular intervals and will be held on carrier strip 20 by e respective adhesive.

Moreover, a mark M is mounted on carrier strip 20 between two adjacent loops 30. Mark M is positioned on carrier strip 20 at a predefined distance from the end of carrier strip 20. That means, a predefined number of loops 30 is placed in feeding direction F behind mark M, or upstream mark M.

In FIG. 1, mark M is attached to upper surface 26 of carrier strip 20. To avoid damage of mark M, a covering element in the form of a rectangular sticker 40 or the like overlays mark M. Sticker 40 may be a layer including one self-adhesive surface with which it is attached to mark M and carrier strip 20. Alternatively, sticker 40 may also be held by an adhesive material on surface 26 of carrier strip 20.

Figure 2:
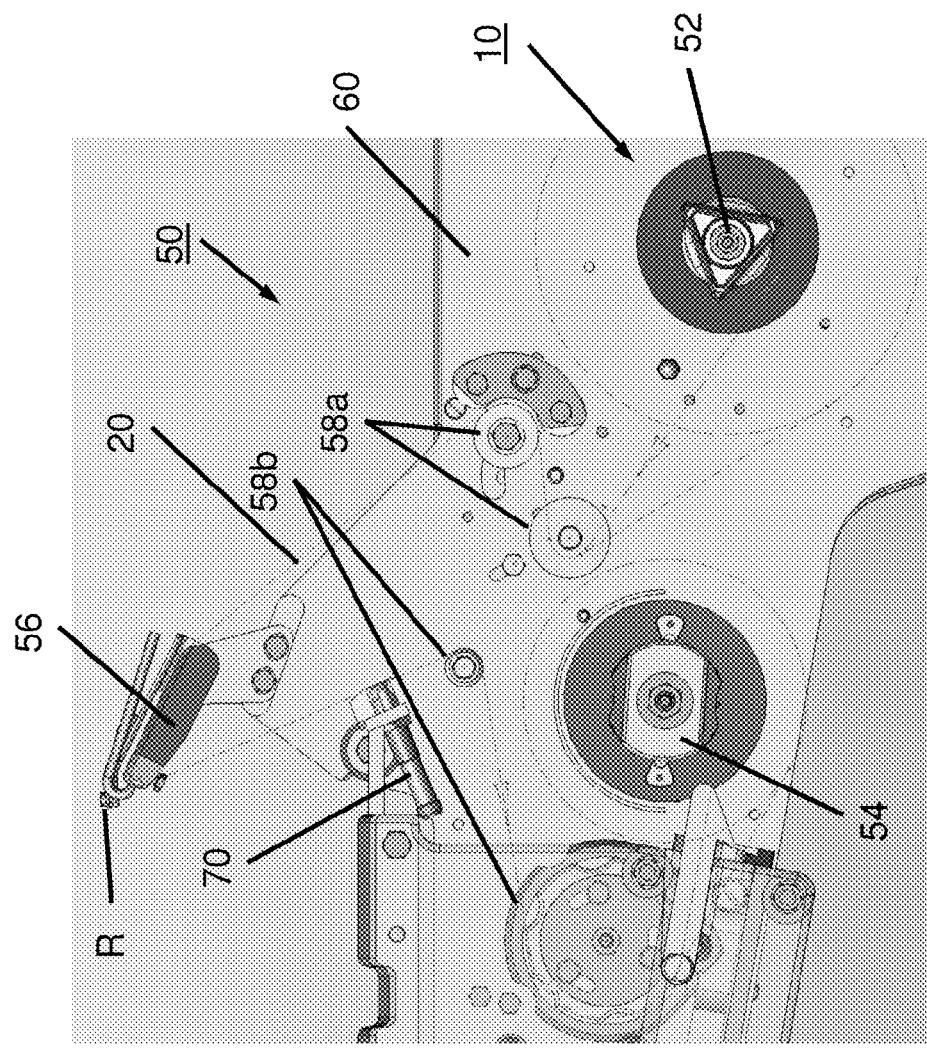
FIG. 2: is a schematic view to a feeding device for feeding suspension elements from a supply of suspension elements according to the invention to a clipping machine.

FIG. 2 is a schematic view to a feeding device 50 for feeding suspension elements 30 to a clipping machine. Feeding device 50 includes a first holder 52 for accommodating supply 10 of suspension elements according to the invention, a second holder 54 for picking up the emptied carrier strip 20 after loops 30 have been removed therefrom, and a guide device 56 for guiding carrier strip 20 to receiving position R in which the front most loop 30 is caught to be attached to the sausage-shaped product just produced. Feeding device 50 is mounted to a framework 60 of the clipping machine.

As it can be seen in FIG. 2, carrier strip 20 unwound from supply 10, is guided via first rollers 58*a* to guide device 56 and the empty strip 20 via a second rollers 58*b* to second holder 54, where the emptied carrier strip 20 is picked up. Between guide device 56 and second rollers 58*b*, a sensor device 70 is positioned as to sense carrier strip 20 when sliding along sensor device 70 for detecting mark M on carrier strip 20. It has to be understood that sensor device 70 is coupled to the control unit of the clipping machine.

In operation, for producing a sausage-shaped product, filling material is fed by a filling machine through a filling tube of the clipping machine into a tubular casing material, which is stored on the filling tube and which is closed at its front end by closure or closing clip C. After a predetermined volume of filling material is filled into said tubular casing material, a displacement device with a first and a second pair of displacement elements forms a plait-like portion of the tubular casing material and the clipping machine places and closes at least one closing clip C at the plait-like portion forming the back end of the sausage shaped product, by respective closing tools.

A loop 30 of supply 10, which has to be attached to the sausage-shaped product just produced, is or has already been fed by feeding device 50 to receiving position R. In this position, loop 30 is placed in the path way of closing clip C when applied to the plait-like portion of the gathered tubular casing material. Closing clip C which conventionally is of a substantially U-shape, engages loop 30 by one of its free legs and pulls loop 30 from carrier strip 20 towards the plait-like portion of the sausage-shaped product just produced. In the time or immediately after a next portion of tubular casing material is filled, carrier strip 20 is moved forward for placing the subsequent loop 30 on carrier strip 20 in receiving position R.

During the production process, or alternatively, each time carrier strip 20 is moved, carrier strip 20 is sensed by sensor device 70. While mark M passes sensor device 70, it is detected by sensor device 70 which outputs a respective signal to the control unit of the clipping machine.

Since mark R is attached to carrier strip 20 at a predefined position from its end, and depending on the position of sensor device 70 relative to receiving position R, a predefined number of loops 30 remains upstream receiving position R on carrier strip 20. According to the detection of mark M, the clipping machine produces a number of sausage-shaped products corresponding to the number of loops 30 remaining on carrier strip 20, and thereafter the clipping machine is stopped for allowing a user to place a now supply 10 of loops 30 on first holder 52 of the clipping machine and remove emptied carrier strip 20 from second holder 54.

As mentioned above, mark M is placed on carrier strip 20 at a predefined position from its end and thus, a predetermined number of loops 30 is placed between mark M and the end of carrier strip 20. Normally, the position of Mark M on carrier strip 20 is equal to each supply 10 of loops 30, independently from the size of loops 30 or the number of loops 30 contained in supply 10. On the other hand, the position of mark M may be determined based on the size of loops 30 or the kind of clipping machine on which supply 10 shall be used.

The signal sent from sensor device 70 to the control unit of the clipping machine may be a simple signal which only indicates the presence of mark M in the sensor area of sensing device 70. Mark M can be a single sheet of metal and sensor device 70 may include a magnetic or an inductive sensor element for detecting said sheet of metal.

Alternatively, mark M may include data, e.g. regarding the number of loops positioned upstream mark M on carrier strip 20. In this case, sensor device 70 includes a reading device for reading out said data from mark M which in this case may be an RFID label.

By receiving the signal from sensor device 70, based on the number of loops 30 remaining on carrier strip 20 upstream receiving position R, the control unit determines the number of sausage-shaped products, which may be produced together with said remaining loops 30. According to said number of sausage-shaped products, the control unit of the clipping machine may also output a general signal or a specific signal to the user, e.g. informing him about the filling degree of supply 10 and requesting a new supply 10.

In a further alternative configuration, the signal of sensor device 70 may be compared to the supply of the tubular casing material stored on the filling tube and/or to the supply of filling material.

According to FIG. 1, supply 10 of loops 30 is formed by a single carrier strip 20 with loops 30 attached to its upper surface 26. Alternatively, supply 10 may be formed by a carrier strip which is a double layer strip having an upper and a lower layer. In this case, loops 30 disposed between the upper and lower layer. Accordingly, also mark M may be disposed between the upper and lower layer. Thereby mark M is covered by the two layers and a separate covering element 40 is not necessary.

Sensor device 70, according to the embodiment of FIG. 2, is positioned downstream guide device 56 or receiving position R, respectively. Of course, sensor device 70 may also positioned upstream receiving position R in a predefined distance thereto. In this case, by detecting mark M, the number of loops 30 remaining upstream receiving position R is calculated as the number of loops 30 positioned upstream mark M increased by the number of loops positioned between mark M and receiving position R.

Supply 10 is formed by carrier strip 20 including loops 30, which is wound to form a roll. In most cases, it is not necessary to wind carrier strip 20 with loops 30 on a reel. But, e.g. by providing sensitive loops, it may be desirable to wind carrier strip 20 on a reel including sidewalls for covering said sensitive loops 30. Accordingly, at least first holder 52 should be adapted for receiving supply 10 either wound to a single roll or a reel on which carrier strip 20 is wound.

The invention claimed is:

1. A supply of suspension elements being fed in a feeding direction to a clipping machine for producing sausage-shaped products and being attached to said sausage-shaped products, the supply comprises:
    a carrier strip having at least an upper and a lower surface and two longitudinally extending edges arranged parallel to each other, and
    a plurality of suspension elements attached to the upper or lower surface of the carrier strip in at least substantially regular intervals, wherein the carrier strip, including the suspension elements, is wound, thereby forming a roll, and having at least one mark which is attached to the carrier strip at a predefined distance from an end of the carrier strip.

2. The supply according to claim 1, wherein the at least one mark includes information regarding a number of suspension elements remaining on the carrier strip in the feeding direction upstream of said mark.

3. The supply according to claim 2, wherein the information included in the at least one mark is used for controlling the clipping machine.

4. The supply according to claim 1, wherein the at least one mark is a machine readable label.

5. The supply according to claim 4, wherein the at least one mark is a RFID label.

6. The supply according to claim 1, wherein the at least one mark is covered by a covering element.

7. The supply according to claim 1, wherein the carrier strip of the supply is a double layer strip having an upper and a lower layer, with the upper and lower layer each having an upper and a lower surface and with the lower layer facing the lower surface of the upper layer with its upper surface, with the suspension elements disposed between the upper and lower layer in at least substantially regular intervals, and wherein the at least one mark is also disposed between the upper and lower layer at the predefined distance from an end of the carrier strip.

8. The supply according to claim 1, wherein the clipping machine comprises a sensor device for detecting the at least one mark which is attached to the carrier strip of the supply, and for reading information stored on the at least one mark.

9. The supply according to claim 1, wherein the suspension elements comprise suspension loops.

10. The supply according to claim 1, wherein the sausage-shaped products comprise sausages.

11. A method for detecting an end of a supply of suspension elements fed in a feeding direction to a clipping machine for producing sausage-shaped products and being attached to said sausage-shaped products, the method comprises the steps of:
    feeding suspension elements, which are attached to an upper or lower surface of a carrier strip in at least substantially regular intervals, to the clipping machine for attaching said suspension elements to the sausage-shaped products, and
    scanning the carrier strip and detecting at least one mark positioned on the carrier strip at a predefined distance from an end of the carrier strip.

12. The method according to claim 11, further including the step of reading the information stored on the at least one mark.

13. The method according to claim 12, further including the step providing a signal to the clipping machine for controlling the clipping machine on the basis of the information readout of the at least one mark.

14. The method according to claim 12, further including the step of outputting a signal corresponding to the information readout of the at least one mark.

15. The method according to claim 11, wherein the at least one mark has information regarding a number of suspension elements remaining on the carrier strip in the feeding direction upstream of the mark.

16. The method according to claim 11, wherein the suspension elements comprise suspension loops.

17. The method according to claim 11, wherein the sausage-shaped products comprise sausages.

* * * * *